UNITED STATES PATENT OFFICE.

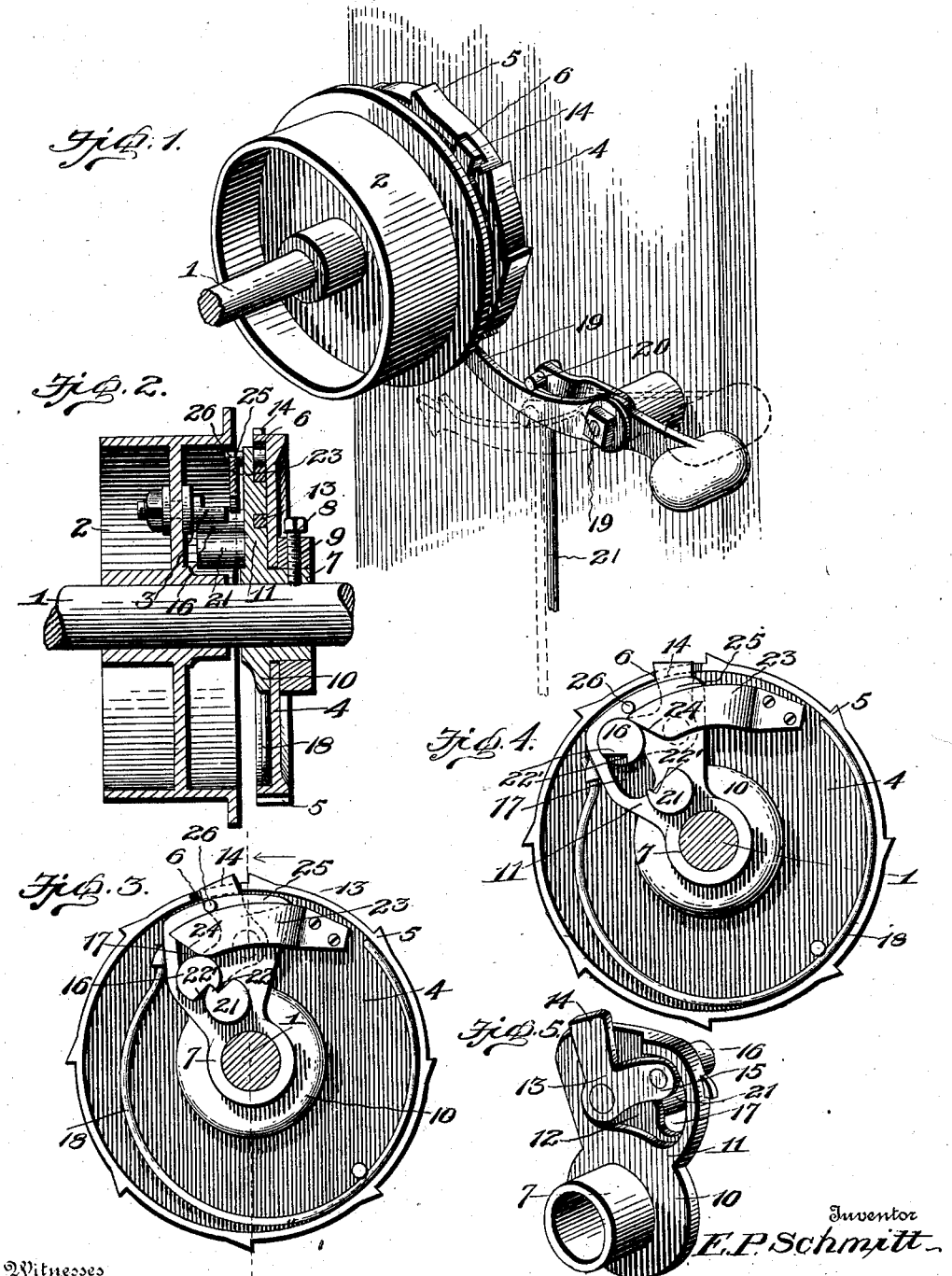

EUGENE P. SCHMITT, OF NEW ALBANY, INDIANA.

CLUTCH.

SPECIFICATION forming part of Letters Patent No. 670,036, dated March 19, 1901.

Application filed November 23, 1900. Serial No. 37,530. (No model.)

*To all whom it may concern:*

Be it known that I, EUGENE P. SCHMITT, a citizen of the United States, residing at New Albany, in the county of Floyd and State of Indiana, have invented certain new and useful Improvements in Clutches; and I do declare the following to be a full, clear, and exact description of the invention, such as will enable others skilled in the art to which it appertains to make and use the same.

This invention relates to improvements in clutches, and particularly to clutches of that type comprising a ratchet-disk carrying a spring-retracted stop-pin adapted to be thrown into or out of the path of a coacting pin on a drive-pulley, whereby an intermittent motion may be imparted to the shaft on which said clutch and pulley are mounted. Clutches of this character are employed in the Bramwell feeders of carding-machines to intermittently start and stop the operation of the drive-shaft of the feed belt or apron to control the delivery of the material under treatment. As heretofore constructed clutches of this type have generally embodied a sleeve rigidly connected, as by a set-screw, to the shaft and provided with a right-angular arm formed with a slot in which plays a bell-crank catch engaging a notch in the edge of a ratchet-disk, the latter mounted to oscillate on said sleeve and to rotate with the shaft. The pin is normally held in operative position by a spring connecting the ratchet disk and arm. The pulley carries a stop-pin, which is adapted to engage the said pin on the bell-crank catch to connect the parts to cause the shaft to rotate with the pulley, and a pawl is provided to act on said ratchet-disk to move the stop-pin on the catch out of the path of the pin on the pulley, allowing the latter to revolve independent of the shaft. The objection to this construction of clutch is that the pins quickly become worn by frictional engagement and require frequent adjustment and replacement. Frequently the pins do not lock, but slip past each other, defeating the purpose of the clutch. At other times when the parts are adjusted to work clear the pins contact or click together, rendering the device unsteady and uncertain in action and noisy.

The object of my invention is to provide a clutch of this character in which a positive locking action is secured when the clutch is in operation, to prevent the pins from becoming disengaged, and in which proper clearance of the pins is insured when the clutch is out of operation, the device being simple in construction, steady and certain in action, and practically noiseless.

With these and other minor objects in view, which will appear as the nature of the invention is better understood, the invention consists of certain novel features of construction, combination, and arrangement of parts, as will be hereinafter more fully described, and particularly pointed out in the appended claims.

In the accompanying drawings, Figure 1 is a perspective view of a clutch embodying my invention. Fig. 2 is a transverse section through the ratchet-wheel and pulley on the line of the shaft. Fig. 3 is an inner side elevational view of the ratchet-disk and connections, showing the position of the pins when the coupling is in use. Fig. 4 is a similar view showing the position of the pins when the coupling is not in use. Fig. 5 is a detail perspective view of the sleeve and arm disconnected, showing the latch.

Like reference characters designate corresponding parts throughout the several views.

The numeral 1 in the drawings represents a shaft which may constitute the drive-shaft of a feed belt or apron of a carding-machine or of any other desired construction of mechanism adapted to be intermittently driven or thrown into and out of operation at definite periods or at any desired intervals of time. On this shaft is loosely mounted a drive-pulley 2, which may receive motion from a belt leading from a suitable source of power, and this pulley is provided on one side with a contact pin or stud 3, forming part of the clutch device. Located alongside the pulley is a ratchet wheel or disk 4, having teeth 5 at suitable intervals around its periphery and a notch 6 at one point in its periphery. This disk is loosely mounted to oscillate upon a hub or sleeve 7, rigidly secured to the shaft by a set-screw 8, which is also passed through a collar 9, which holds the disk against sliding movement in one direction, while a flange 10 on said sleeve holds the disk against like movement in the reverse direction. To the sleeve 7 is connected an arm or support 11, extending at right angles thereto and to the shaft and bearing upon the inner side of the disk, and said arm or support is formed upon its inner side with a chamber or recess 12, in which is arranged a pivoted bell-crank latch 13, one arm 14 of which fits within the said notch 6 in the edge of the disk and connects said disk to the arm to have a limited oscillatory movement on the sleeve 7, while the other arm 15 of said latch carries a stop-pin 16, which plays within a slot 17, formed in the arm 11 when the disk is oscillated. A spring 18, connected at one end to the ratchet wheel or disk and at the other end to the arm 11, normally holds the disk in the position shown in Fig. 3 and automatically returns the disk to this position when released after being turned to throw the clutch out of operation. To operate the disk, a pivoted pawl 19 is provided and is weighted or counterbalanced to return to its normal position by gravity. A contact-stud 20 is pivotally mounted to engage the pawl and is connected to a rod 21, operated in any preferred manner, either by hand or automatic mechanism, according to the application of the device. In the well-known Bramwell feeder for carding-machines this rod is operated periodically to cause the pawl to move and hold the ratchet-disk to the position shown in Fig. 4 and to thus throw the pin 16 out of the path of the pin 3 on the pulley, whereby the pulley turns loosely on the shaft and the motion of the feed-apron is arrested. Between these periods the reverse operation occurs, the pawl being withdrawn from engagement with the ratchet-wheel, which is returned to its normal position by the spring. This brings the pin 16 again in the path of pin 3, and said pins contact, causing the shaft to revolve with the pulley.

The parts thus far described are of the well-known construction. The objection to this construction is, as heretofore pointed out, that the pins 3 and 16 quickly become worn and do not properly coact. To overcome this difficulty, I provide certain additional parts and improved features of construction, which will now be described.

On the arm or support 11 is fixedly mounted a pin 21, which is located at the base of the slot 17 and is notched to form a shoulder 22, which coöperates with a similar shoulder 22' on the pin 16 when said latter pin lies in its normal position at the base or inner end of said slot 17, as shown in Fig. 3. These pins thus coact to prevent any liability of the pin 3 slipping or moving past without contacting with them when they are in the normal position (shown in Fig. 3) and obviate all liability of unsteadiness or unevenness of working of the clutch. When the pin 3 comes in contact with said pins 16 and 22, a broad bearing-surface is provided for it, and the pulley and shaft are locked to revolve together. When the pins are thus arranged, the shoulders 22 22' also form a lock between said pins and obviate all liability of the pin 16 moving outward in its slot under pressure. To further obviate any liability of movement of said pin 16 and to guide the ratchet-disk in its movements, I have provided upon said disk a plate 23, which is secured at one end to the disk and bent so as to have its free portion lie on the inner side of the arm 11. This plate is provided at its free end with a diagonal shoulder 24, upon which the pin 16 is adapted to ride, and a curved guide edge 25, upon which rides a pin 26 on the arm 11. It is obvious from this that the plate 23 provides an auxiliary holding or locking connection which tends to prevent any outward movement of the disk 16 under pressure of the pin 3. When the pawl is operated, the movement of the ratchet-disk forces the pin 16 outward and away from the pin 21, and as the pulley revolves the pin 3 passes between said pins 16 21 without contacting with either.

From the foregoing description, taken in connection with the accompanying drawings, the construction, mode of operation, and advantages of my invention will be readily understood. While the preferred embodiment of the invention is as herein disclosed, modifications within the scope of the invention may be made without departing from the spirit or sacrificing any of the advantages thereof.

Having thus described my invention, what I claim, and desire to secure by Letters Patent, is—

1. In a clutch of the character described, the combination, with a shaft, and an actuating element loosely mounted thereon and provided with a contact-pin, of a support fixed to the shaft, an oscillatory disk, a movable connection between the support and disk, means for oscillating the disk, means for returning the disk to its normal position, and relatively fixed and movable contact-pins on said support and movable connection, said pins being adapted to interlock and to coöperate with the said contact-pin on the actuating element, substantially as and for the purpose set forth.

2. In a clutch of the character described, a shaft, an actuating element loose on the shaft and carrying a contact device, a clutch device comprising relatively fixed and movable members carrying a pair of interengaging contact devices coöperating with the said contact device on the actuating element, and means for operating said movable member of the clutch device to throw said pair of contact devices into and out of engagement, substantially as and for the purpose set forth.

3. In a clutch of the character described, a shaft, an actuating element loose on the shaft and carrying a contact device, a clutch device comprising relatively fixed and movable members carrying a pair of interengaging contact devices coöperating with the said contact device on the actuating element, means for operating said movable member of the clutch device to throw said pair of contact devices into and out of engagement, and means for preventing casual separation of the pair of contact devices, substantially as and for the purpose set forth.

4. In a clutch of the character described, the combination, with a shaft, and an actuating element loosely mounted thereon, and provided with a contact-pin, of a support fixed to the shaft and provided with a guide-slot and a contact-pin, an oscillatory ratchet-disk, a movable connection between the support and disk and carrying a contact-pin movable in said slot and adapted to interlock with the contact-pin on the support, means for operating the disk to move said movable contact-pin away from the pin on the support, and means for retracting the disk, substantially as and for the purpose set forth.

5. In a clutch of the character described, the combination, with a shaft, and an actuating element loosely mounted thereon, and provided with a contact-pin, of a support fixed to the shaft and provided with a guide-slot and a contact-pin, an oscillatory ratchet-disk, a movable connection between the support and disk and carrying a contact-pin movable in said slot and adapted to interlock with the contact-pin on the support, means for operating the disk to move said movable contact-pin away from the pin on the support, means for retracting the disk, a plate carried by the disk and having opposite engaging faces one of which is adapted for the movable contact-pin to ride upon, and a pin on the support to ride upon the other engaging face of the plate, substantially as and for the purpose set forth.

In testimony whereof I have hereunto set my hand in presence of two subscribing witnesses.

EUGENE P. SCHMITT.

Witnesses:
JAMES P. HANNAN, Jr.,
THOMAS J. BURNS.